United States Patent
Chao et al.

(10) Patent No.: US 7,587,456 B2
(45) Date of Patent: Sep. 8, 2009

(54) OPERATION SYSTEM AND METHOD OF WORKFLOW INTEGRATED WITH A MAIL PLATFORM AND WEB APPLICATIONS

(75) Inventors: Pei Chao, Hsinchu Hsien (TW); Shuenn-Her Lee, Yung-Kang (TW); Pui-Kwan Lee, Hsinchu (TW)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 821 days.

(21) Appl. No.: 11/023,748

(22) Filed: Dec. 28, 2004

(65) Prior Publication Data

US 2006/0143273 A1    Jun. 29, 2006

(51) Int. Cl.
  *G06F 15/16* (2006.01)
(52) U.S. Cl. .............................. 709/206; 726/4; 726/27; 726/28; 726/29
(58) Field of Classification Search .................... 726/4, 726/27–29
  See application file for complete search history.

(56) References Cited

U.S. PATENT DOCUMENTS

| 7,424,543 B2 * | 9/2008 | Rice, III | 709/229 |
| 2002/0046170 A1 * | 4/2002 | Gvily | 705/42 |
| 2004/0187002 A1 * | 9/2004 | Iida | 713/175 |
| 2005/0188026 A1 * | 8/2005 | Hilbert et al. | 709/206 |
| 2005/0198165 A1 * | 9/2005 | Reddel et al. | 709/206 |
| 2006/0080384 A1 * | 4/2006 | Robinson et al. | 709/203 |

FOREIGN PATENT DOCUMENTS

| TW | 468315 | 12/2001 |
| TW | 545019 | 8/2003 |

OTHER PUBLICATIONS

Taiwan Office Action mailed Oct. 20, 2006.

* cited by examiner

*Primary Examiner*—Kenny S Lin
*Assistant Examiner*—Duyen Doan
(74) *Attorney, Agent, or Firm*—Thomas, Kayden, Horstemeyer & Risley

(57) ABSTRACT

Operation system and method of workflow are provided. The system includes a mail platform and a web application. The mail platform receives an email including an application identification of the web application, a target URL corresponding to a target, and at least one recipient. The mail platform then mails a notification email including a data processor and the email to the recipient. The data processor automatically retrieves user information of an operator if the data processor in the notification email is triggered by the operator, and transmits a message having the user information and the target URL to the web application according to the application identification. The web application authenticates the user information and launches the target according to the target URL if the user information conforms to the recipient.

20 Claims, 5 Drawing Sheets

OPERATION SYSTEM AND METHOD OF WORKFLOW INTEGRATED WITH A MAIL PLATFORM AND WEB APPLICATIONS

BACKGROUND

The present invention relates to workflow management, and particularly to a system and method of workflow integrated with a mail platform and web applications.

Workflow is the process of a business procedure, in whole or part, during which documents, information or tasks are passed from one participant to another for related action. Workflow management is an important issue for enterprises. An example of a platform for assisting with workflow management is Lotus Notes which is a mail platform designed for workflow management. An effective workflow improves the efficiency of enterprises, provides for the automation of business processes, and the elimination of many unnecessary steps, thereby strengthening the enterprises' competitive ability.

In addition, several web applications have been developed to solve workflow problems. However, these web applications and the conventional workflow applications are designed independently. The independent design causes participants to have to repeatedly input authentication information to login to the workflow system and to login to the web applications designated by the workflow system.

FIG. 1 shows the process of the conventional workflow operation between a workflow system and web applications.

First, in step S101, a user logins a web application. In step S102, the user performs actions to relate a target, such as a document on the web application. After the actions finish, in step S103, the user performs mechanisms provided by the web application to for example, submit a notification email to an approver via a mail platform of the workflow system, in which the notification email may include information of the identification of the web application, the target, subject, and others. Thereafter, in step S104, the approver logins the mail platform to receive and check the notification email. Afterward, in step S105, the approver logins the web application according to the information of the notification email. In step S106, the approver approves the target on the web application.

In the above practice, the approver has to repeatedly input authentication information to login to the mail platform and the web application. In addition, if the web map (website hierarchy) of the web application is complicated, it is time-consuming for the approver to find the target. Since the mail platform is proprietary and other platforms have their own authentication mechanism, it is difficult to integrate the workflow from the mail platform into web-based applications.

SUMMARY OF THE INVENTION

The invention is directed to novel systems and methods that include a mail platform and at least one web application. The mail platform receives an email including an application identification of the web application, a target URL corresponding to a target, and at least one recipient from the web application. The mail platform mails a notification email including a data processor and the email to the recipient, in which the data processor retrieves user information of an operator if the data processor in the notification email is triggered by the operator, and transmits a message having the user information and the target URL to the web application according to the application identification. The web application authenticates the user information and launches the target according to the target URL if the user information conforms to the recipient.

The present invention can also be viewed as providing methods for workflow integrated with a mail platform and web applications. In this regard, one embodiment of such a method, among others, can be broadly summarized as a mail platform receiving an email from a web application, in which the email includes an application identification of the web application, a target URL corresponding to a target, and at least one recipient. Then, the mail platform mails a notification email including a data processor and the email to the recipient. Thereafter, the data processor retrieves user information of an operator if the data processor in the notification email is triggered by the operator. Then, the data processor transmits a message having the user information and the target URL to the web application according to the application identification. Afterward, the web application authenticates the user information and launches the target according to the target URL if the user information conforms to the recipient.

Further, the mail platform validates the email, and rejects the email if the email is not valid. In addition, the mail platform parses the email to obtain the application identification, the target URL and the recipient in the email.

Further, the data processor encrypts the message, and redirects the encrypted message to a web control unit. The web control unit decrypts the encrypted message to obtain the user information and the target URL and forwards the user information and the target URL to the web application.

BRIEF DESCRIPTION OF THE DRAWINGS

The aforementioned objects, features and advantages of this invention will become apparent by referring to the following detailed description of the preferred embodiments with reference to the accompanying drawings.

DETAILED DESCRIPTION OF THE INVENTION

Disclosed herein are novel systems and methods for workflow integrated with a mail platform and web applications. To facilitate description of the inventive system, an example system that can be used to implement the workflow integrated with a mail platform and web applications is discussed with reference to the figures. Although this system is described in detail, it will be appreciated that this system is provided for purpose of illustration only and that various modifications are feasible without departing from the inventive concept. After the example system has been described, an example of operation of the system will be provided to explain the manner in which the system can be used to provide workflow integrated with a mail platform and web applications.

Figure 1:
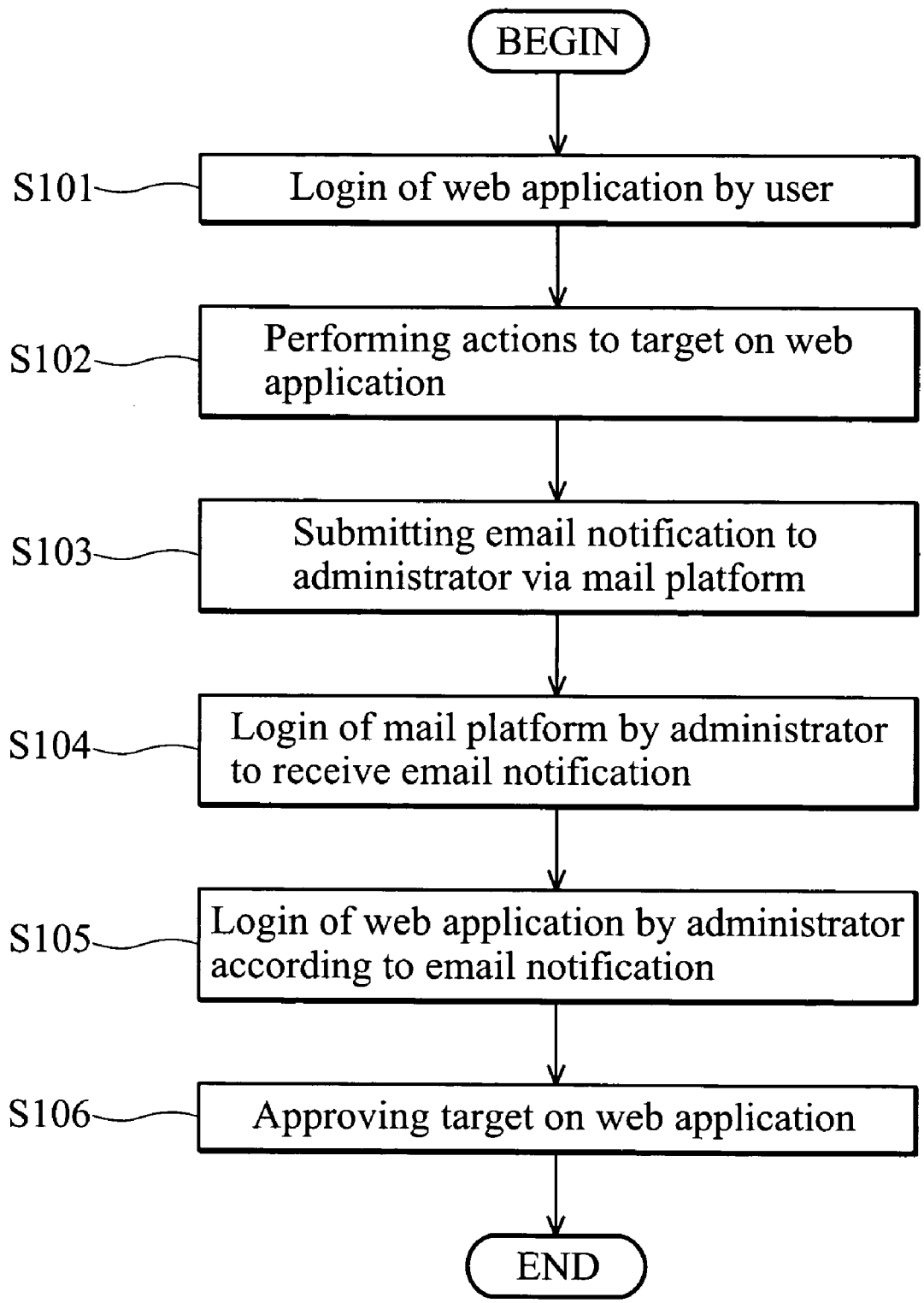
FIG. 1 is a flowchart showing a process of a conventional workflow operation between a workflow system and web application.
Figure 2:
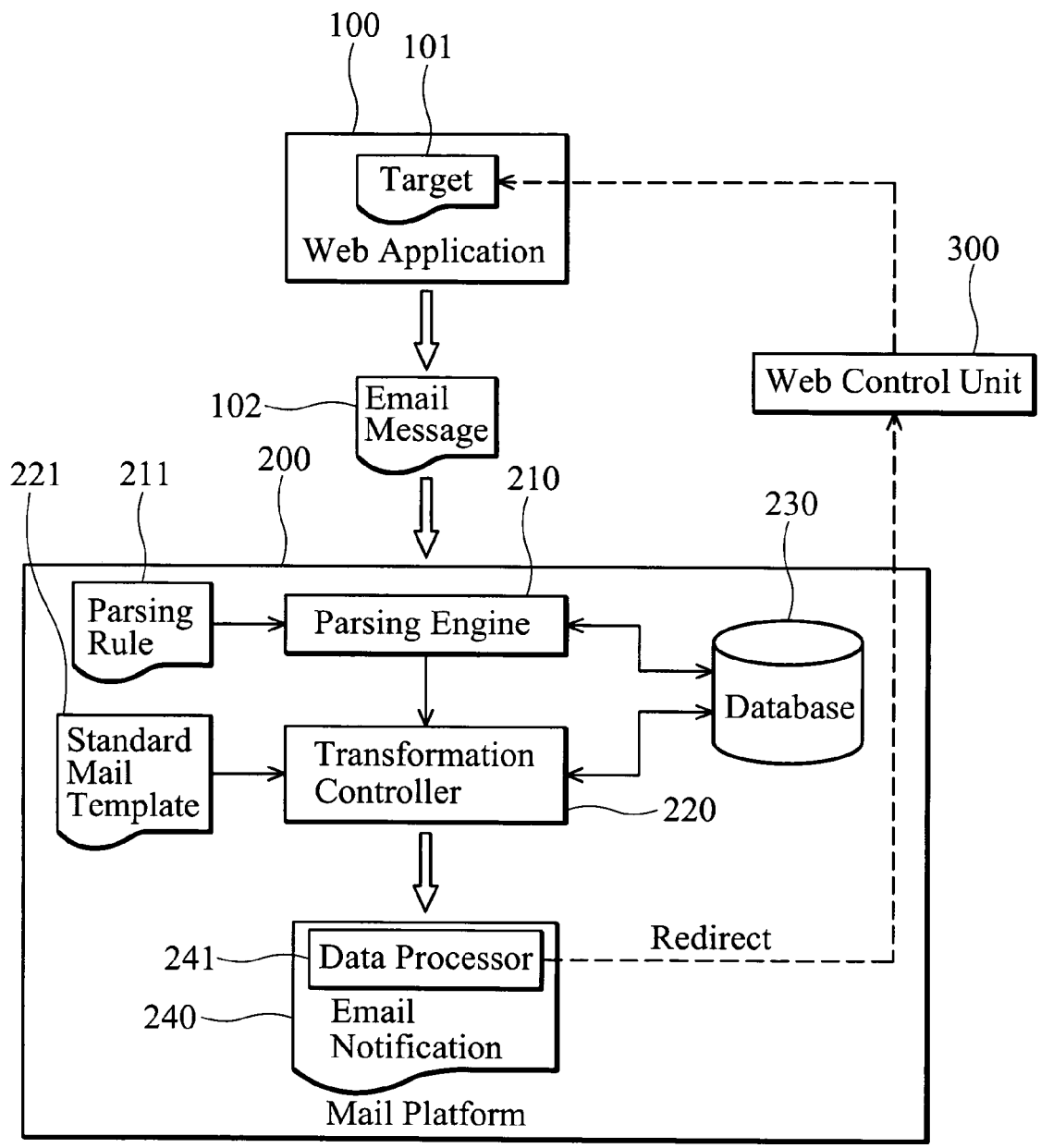
FIG. 2 is a schematic diagram depicting a preferred embodiment of an implementation of an architecture of the operation system of workflow integrated with a mail platform and web applications.

Referring now in more detail to the drawings, FIG. 2 illustrates an example of architecture of a system of workflow integrated with a mail platform and web applications according to the present invention. The system includes a web application 100, a mail platform 200, such as Lotus Notes, and a web control unit 300.

The web application 100 is a web-based design. The web application 100 has a target 101, such as document with a target URL (Uniform Resource Locator) waiting to be performed by related actions or approved. After a user performs the actions to the target 101, the user may perform mechanisms provided by the web application 100 to submit an email 102 to the mail platform 200. In one embodiment, the email 102 includes applicant information, a subject, an application identification of the web application 100, a target URL (Uniform Resource Locator) corresponding to the target 101, and at least one recipient, among other information. It is understood that the present invention is applicable to a plurality of web applications, and each web application can be recognized by its application identification.

The mail platform 200 includes a parsing engine 210, a transformation controller 220 and a database 230. Since the email 102 may be sent in the form of string, the parsing engine 210 parses the email 102 to obtain the email information including the applicant information, the subject, the application identification, the target URL, and the recipient in the email 102 using a parsing rule 211. The parsing engine 210, adds the parsing result to the database 230. In one embodiment, the parsing rule 211 defines an email format that corresponds to each web application. The parsing engine 210 further validates the email 102 according to the email information and a predefined regulation corresponding to the web application 100, and rejects the email 102 if the email 102 is not valid. If the email 102 is valid, the transformation controller 220 performs operations as follows.

The transformation controller 220 generates a notification email 240 using a standard mail template 221 corresponding to the web application 100. In one embodiment, the notification email 240 includes a data processor 241 and the email information, in which the data processor 241 can include a button encoded with program codes. The transformation controller 220 then mails the notification email 240 to the recipient.

The data processor 241 retrieves user information of an operator if the data processor 241 in the notification email 240 is triggered by the operator, and generates a message having the user information and the target URL. It is understood that the mail platform 200 may receive the user information, such as the user identification or/and password from the operator for authentication when the operator logins the mail platform 200. For security consideration, the data processor 241 may encrypt the message using a specific compression mechanism and redirects the encrypted message to the web control unit 300.

The web control unit 300 decrypts the encrypted message to obtain the user information and the target URL and forwards the user information and the target URL to the web application 100 according to the target URL. It is understood that the web control unit 300 may be implemented as a servlet, such as JAVA servlet, and the web control unit 300 may be a console to dispatch messages to corresponding web applications.

After receiving the message, the web application 100 authenticates the user information and directly launches the target 101 according to the target URL if the user information conforms to the recipient.

Figure 3:
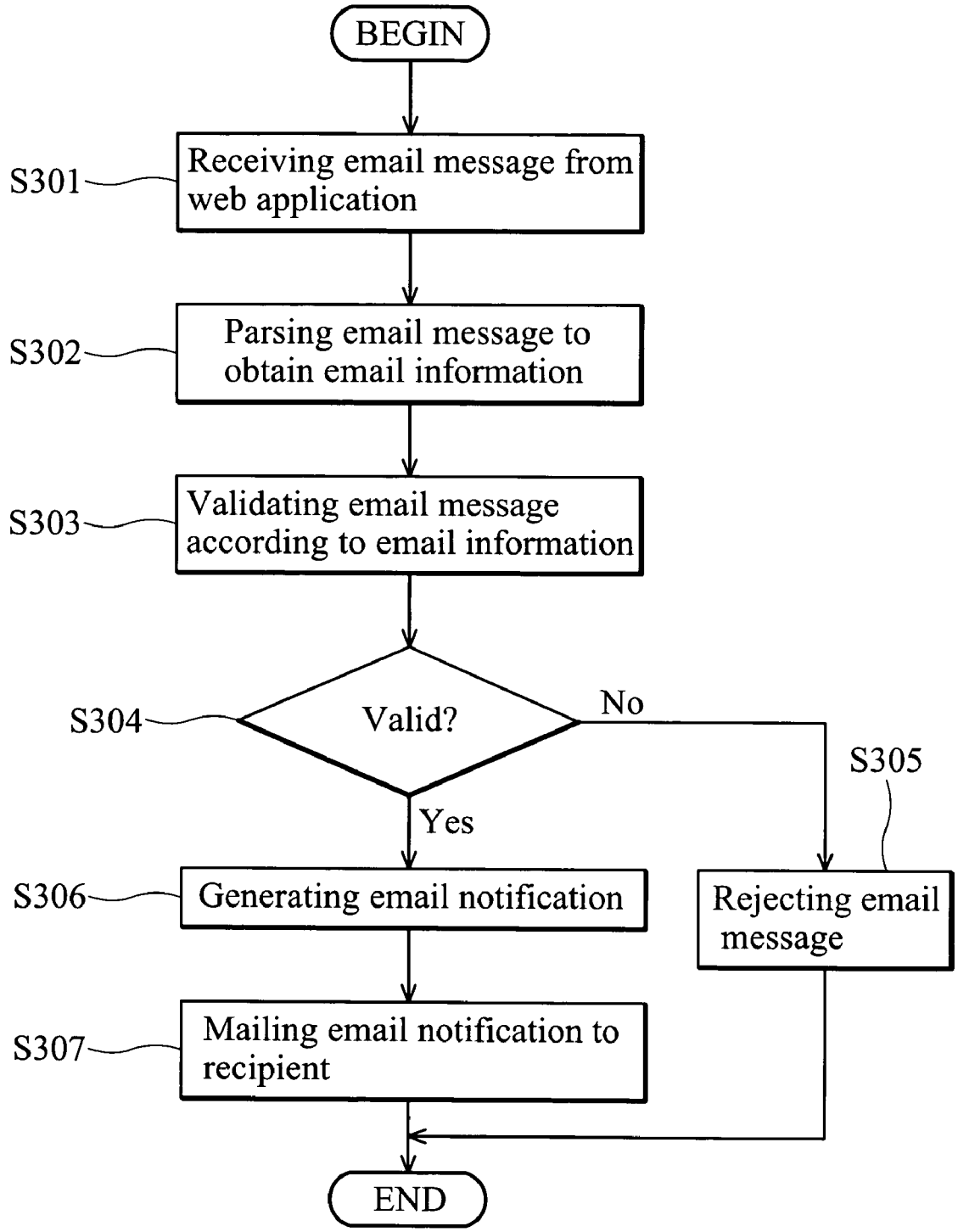
FIG. 3 is a flow chart depicting general functionality, in accordance with one preferred embodiment of an implementation of a process of workflow integrated with a mail platform and web applications.

FIG. 3 is a flowchart of an embodiment of functionality of workflow integrated with a mail platform and web applications according to the present invention.

In step S301, the mail platform receives the email from the web application. Preferably, the email includes applicant information, subject, application identification of the web application, target URL corresponding to the target and recipient, among other information. In step S302, a mail platform parses the email to obtain the email information including the applicant information, the subject, the application identification, the target URL, and the recipient in the email, and adds the parsing result in a database.

In step S303, the mail platform validates the email according to the email information. If the email is not valid (i.e., No in step S304), in step S305, the mail platform rejects the email. Otherwise (i.e., Yes in step S304), in step S306, the mail platform generates a notification email using a standard mail template corresponding to the web application, in which the notification email includes a data processor and the email information. Then, in step S307, the mail platform mails the notification email to the recipient.

Figure 4A:
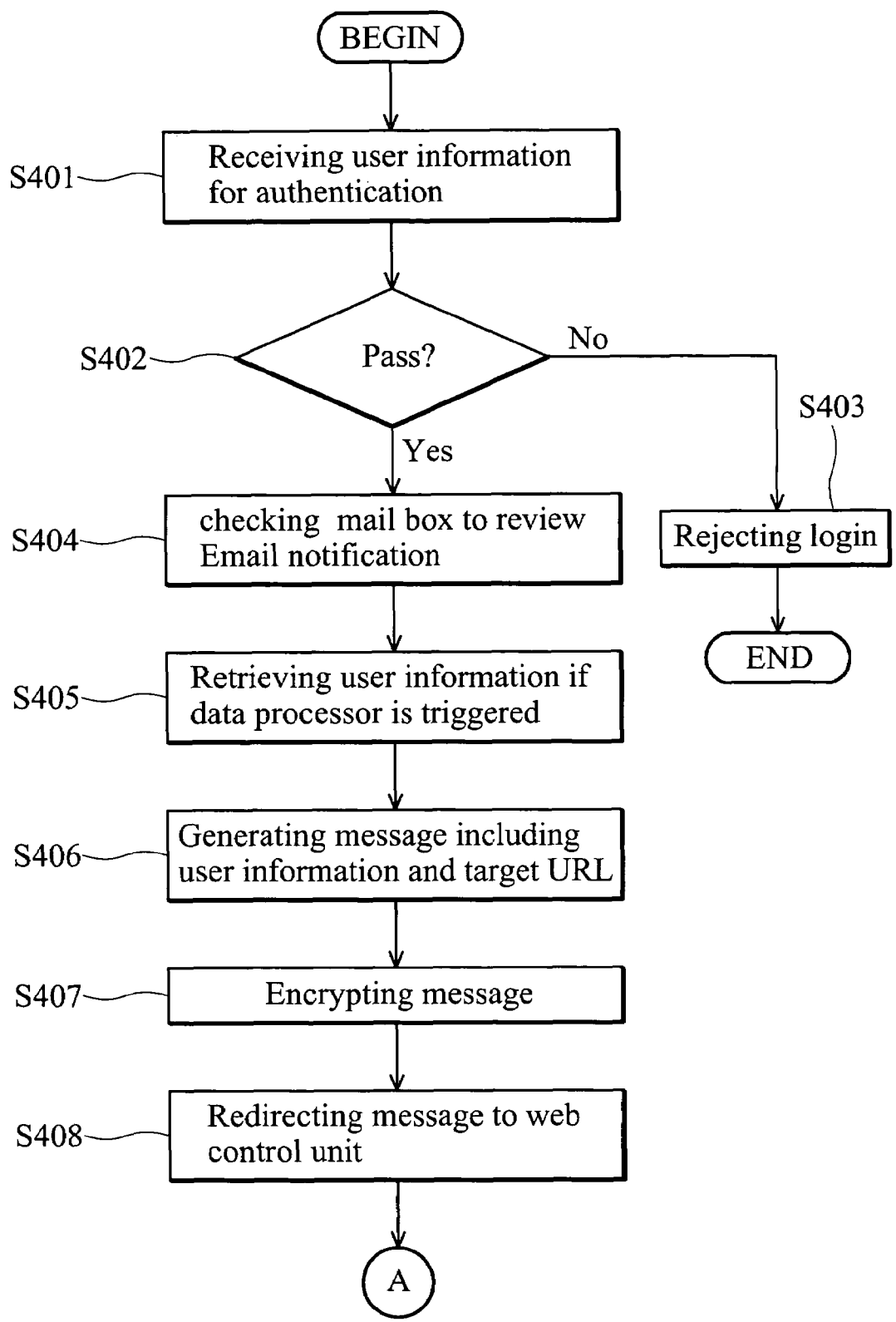
FIGS. 4A and 4B are flowcharts depicting general functionality, in accordance with one preferred embodiment of an implementation of a process of workflow integrated with a mail platform and web applications.

FIG. 4A is a flow chart of an embodiment of functionality of workflow integrated with a mail platform and web applications according to the present invention. When an operator logins to a mail platform, in step S401, the mail platform receives user information, such as the user identification or/and password from the operator for authentication. If the authentication fails (i.e., No in step S402), in step S403, the mail platform rejects the operator to login. Otherwise (i.e., Yes in step S402), in step S404, the operator checks his mailbox to review the notification email.

In step S405, the data processor retrieves user information of the operator if the data processor in the notification email is triggered. Thereafter, in step S406, the data processor generates a message having the user information and the target URL. In step S407, the data processor encrypts the message using a specific compression mechanism. In step S408, the data processor redirects the encrypted message to the web control unit. The process continues on FIG. 4B.

Figure 4B:
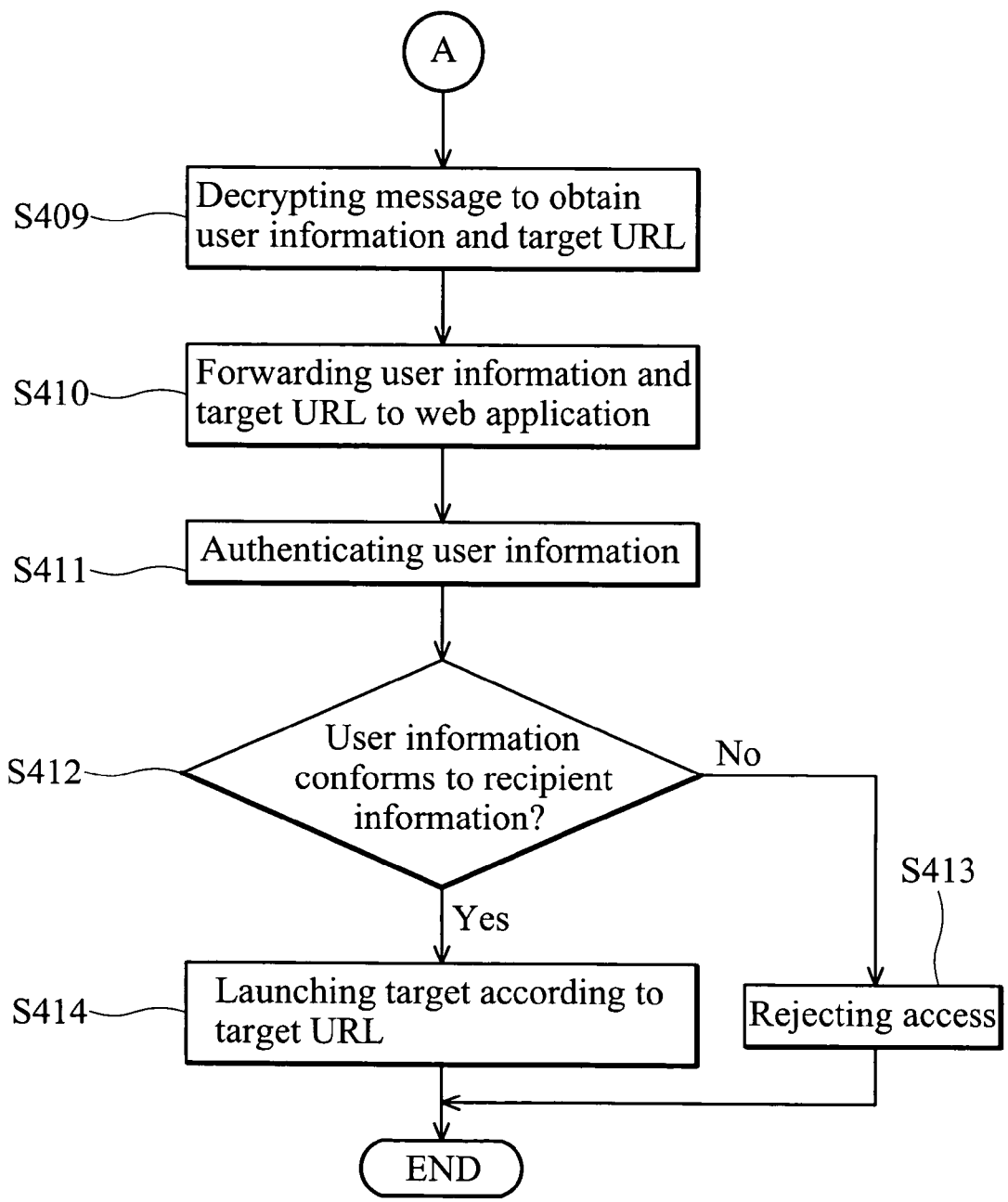

Referring to FIG. 4B, in step S409, the web control unit decrypts the encrypted message to obtain the user information and the target URL. In step S410, the web control unit forwards the user information and the target URL to the web application. After receiving the message, in step S411, the web application authenticates the user information. If the user information does not conform to the recipient (i.e., No in step S412), in step S413, the web application rejects the access. Otherwise (i.e., Yes in step S412), in step S414, the web application directly launches the target according to the target URL. It is understood that if the notification email is forwarded to others, the security is provided when step S412 is performed, and only the original owner (i.e., recipient) of the notification email can pass the authentication.

The methods and systems of the present invention, or certain aspects or portions thereof, may take the form of program code or logic (i.e., instructions) embodied in tangible media, such as floppy diskettes, CD-ROMS, hard drives, or any other machine-readable storage medium, wherein, when the program code or logic is loaded into and executed by a machine, such as a computer, the machine becomes an apparatus for practicing the invention. The methods and apparatus of the present invention may also be embodied in the form of program code or logic transmitted over some transmission medium, such as electrical wiring or cabling, through fiber optics, or via any other form of transmission, wherein, when the program code or logic is received and loaded into and executed by a machine, such as a computer, the machine becomes an apparatus for practicing the invention. When implemented on a general-purpose processor, the program code or logic combines with the processor to provide a unique apparatus that operates analogously to specific logic circuits.

Accordingly, using the systems and methods of workflow integrated with a mail platform and web applications of the present invention, a single sign on solution from the mail platform to the web applications can be established, and the workflow operation can be increased, thereby strengthening competitive abilities of enterprises.

Although the present invention has been described in its preferred embodiments, it is not intended to limit the invention to the precise embodiments disclosed herein. Those who are skilled in this technology can still make various alterations and modifications without departing from the scope and spirit of this invention. Therefore, the scope of the present invention shall be defined and protected by the following claims and their equivalents.

What is claimed is:

1. An operation system of workflow integrated with a mail platform and web applications the operation system comprising:
   at least one web application, wherein the web application has a target and a first authentication procedure, and the web application is configured to send an email comprising an application identification of the web application, a target URL (Uniform Resource Locator) corresponding to the target, and at least one recipient; and
   a machine executing a mail platform, wherein the mail platform performs a second authentication procedure to obtain user information of an operator, and comprises a transformation controller configured to receive the email, and configured to mail a notification email including a data processor and the received email to the at least one recipient, wherein the data processor including a button encoded with program codes; wherein the first authentication procedure and the second authentication procedure are independently managed by the web application and the mail platform, respectively,
   wherein the data processor automatically retrieves the user information of the operator from the mail platform if the data processor in the notification email is triggered by the operator, and transmits a message having the user information and the target URL to the web application who sent the mail according to the application identification, and
   the web application performs the first authentication procedure to authenticate the user information and launches the target thereon according to the target URL if the user information conforms to the recipient.

2. The operation system of claim 1 wherein the web application is configured to send the email in string manner.

3. The operation system of claim 2 wherein the mail platform is further configured to validate the email, and to reject the email if the email is not valid.

4. The operation system of claim 1 wherein the data processor is further configured to encrypt the message, and to redirect the encrypted message to a web control unit.

5. The operation system of claim 4 wherein the web control unit is further configured to decrypt the encrypted message to obtain the user information and the target URL to forward the user information and the target URL to the web application.

6. A method for workflow integrated with a mail platform and web applications, comprising the steps of:
   receiving an email from a web application by a mail platform, in which the web application has a target and a first authentication procedure, the mail platform has a second authentication procedure, and the email comprises an application identification of the web application, a target URL (Uniform Resource Locator) corresponding to the target, and at least one recipient, wherein the first authentication procedure and the second authentication procedure are independently managed by the web application and the mail platform, respectively;
   mailing a notification email including a data processor and the received email to the at least one recipient, wherein the data processor including a button encoded with program codes;
   the mail platform performs the second authentication procedure to obtain user information of an operator;
   automatically retrieving the user information of the operator from the mail platform if the data processor in the notification email is triggered by the operator;
   transmitting a message having the user information and the target URL to the web application according to the application identification, wherein the web application sent the email; performs the first authentication procedure to authenticate the user information by the web application; and
   launching the target on the web application according to the target URL if the user information conforms to the recipient by the web application.

7. The method of claim 6 further comprising sending the email in string manner.

8. The method of claim 7 further comprising validating the email, and rejecting the email if the email is not valid.

9. The method of claim 6 further comprising encrypting the message by the data processor, and redirecting the encrypted message to a web control unit.

10. The method of claim 9 further comprising decrypting the encrypted message by the web control unit to obtain the user information and the target URL and forwarding the user information and the target URL to the web application.

11. A machine-readable storage medium comprising a computer program, which, when executed, causes a device to perform an operation method for workflow, and the method comprising:
   receiving an email from a web application by a mail platform, in which the web application has a target and a first authentication procedure, the mail platform has a second authentication procedure, and the email comprises an application identification of the web application, a target URL (Uniform Resource Locator) corresponding to the target, and at least one recipient, wherein the first authentication procedure and the second authentication procedure are independently managed by the web application and the mail platform, respectively;
   mailing a notification email including a data processor and the received email to the at least one recipient, wherein the data processor including a button encoded with program codes;
   the mail platform performs the second authentication procedure to obtain user information of an operator;
   automatically retrieving the user information of the operator from the mail platform if the data processor in the notification email is triggered by the operator;
   transmitting a message having the user information and the target URL to the web application according to the application identification, wherein the web application sent the email; performs the first authentication procedure to authenticate the user information by the web application; and launching the target on the web application according to the target URL if the user information conforms to the recipient by the web application.

12. The machine-readable storage medium of claim 11 wherein the method further comprises the web application authenticating the user information and launching the target according to the target URL if the user information conforms to the recipient.

13. The machine-readable storage medium of claim 11 wherein the email is sent in string manner.

14. The machine-readable storage medium of claim 13 wherein the method further comprises parsing the email, thereby obtaining the application identification, the target URL and the recipient.

15. The machine-readable storage medium of claim 14 wherein the method further comprises validating the email, and rejecting the email if the email is not valid.

16. The machine-readable storage medium of claim 11 wherein the method further comprises the data processor encrypting the message, and redirecting the encrypted message to a web control unit.

17. The machine-readable storage medium of claim 16 wherein the method further comprises the web control unit decrypting the encrypted message to obtain the user information and the target URL and forwarding the user information and the target URL to the web application.

18. The machine-readable storage medium of claim 16 wherein the web control unit is implemented using a servlet.

19. The machine-readable storage medium of claim 11 wherein the method further comprises the transformation controller receiving a user identification and a password from the operator when the operator logins the mail platform.

20. The machine-readable storage medium of claim 19 wherein the user information is retrieved from the mail platform, and the user information is the user identification of the operator.

\* \* \* \* \*